Oct. 6, 1970 J. C. ELLIS 3,532,823

TELEPHONE ACTUABLE SWITCH ATTACHMENT

Filed May 27, 1968 2 Sheets-Sheet 1

INVENTOR
JACK C. ELLIS

BY Jack M. Wiseman

ATTORNEY

Oct. 6, 1970 J. C. ELLIS 3,532,823

TELEPHONE ACTUABLE SWITCH ATTACHMENT

Filed May 27, 1968 2 Sheets-Sheet 2

INVENTOR.
JACK C. ELLIS

BY Jack M. Wiseman

ATTORNEY

United States Patent Office 3,532,823

Patented Oct. 6, 1970

3,532,823

TELEPHONE ACTUABLE SWITCH ATTACHMENT

Jack C. Ellis, 2298 S. 1st St., San Jose, Calif. 95112

Filed May 27, 1968, Ser. No. 732,128

Int. Cl. H04m *1/08*

U.S. Cl. 179—2 12 Claims

ABSTRACT OF THE DISCLOSURE

An attachment for a telephone having extendable arms for frictional abutting engagement with a base portion of the telephone wherein switch structure is supported by said attachment and is so positioned that the telephone handset engages a switch actuating lever when the handset is placed on the telephone in its normal position, and, wherein the switch is actuable when said handset is removed from the telephone to thereby control an audio circuit to reduce the sound volume from an audio device or to deenergize the audio circuit so that a user of the telephone is not bothered by loud sound from the audio device, and, further, when the handset is replaced on the telephone, the sound volume of the audio device returns to a predetermined level. A switch actuating lever of resilient material is provided to facilitate the operation of the switch by the mere removal and replacement of the handset relative to the telephone and is mounted in a switch housing integral with said attachment.

The present invention relates generally to an attachment for a telephone, and more particularly to a switch supporting structure held in place on said telephone, and wherein the removal or replacement of the telephone handset actuates said switch to control the operation of an audio device by either controlling the volume of the audio device or by shutting off the audio device, and wherein replacement of the handset will restore the original volume of the audio device or turn it back on again.

BACKGROUND OF THE INVENTION

While a number of switches have been devised for operating in conjunction with the removal and replacement of the handset of a telephone, these prior art switches have not been as readily attached to the telephone, and often the prior art switching mechanisms have been elaborate and complex in construction.

SUMMARY OF THE INVENTION

In general terms, it is an objective of the present invention to provide an attachment for a telephone that is readily attached, and wherein the attachment has a switch means integral therewith that is operable by the removal or replacement of the telephone handset. The switch means is actuated by the positioning of the telephone handset to energize or deenergize an audio circuit in a radio receiver or television receiver or the like.

Specifically, the attachment for the telephone and the switch means operative by the removal or replacement of the handset is to either eliminate the sound from a radio or television set, or to reduce the sound to such an extent that the user of the telephone is not bothered by radio or television sounds.

It is therefore an object of the invention to provide an economical switch attachment that is readily installed on a telephone for controlling an audio device when the handset is either removed or replaced relative to the cradle of the telephone.

It is another object of the invention to provide a resilient plastic switch operating means that is engageable with the handset, and that the removal or replacement of the handset operates the switch to open or close a circuit connected to an audio device or the like.

It is a further object of the invention to provide a novel attachment means for a switch wherein the attachment means may be readily attached to the base of a desk telephone.

These and other objects of the invention will be apparent from the specifications and drawings herein.

BRIEF DESCRIPTION OF THE DRAWINGS

The principles of the invention will be more readily understood by reference to the following description and the drawings, of which.

DESCRIPTION OF THE PREFERRED EMBODIMENT

Figure 1:
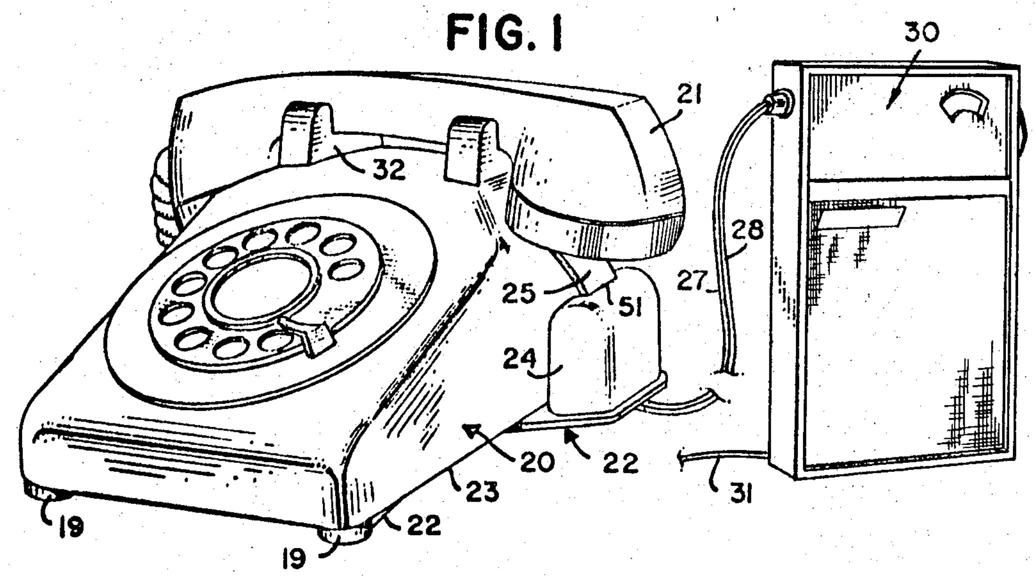
FIG. 1 is a perspective view of a telephone employing the invention.
Figure 2:
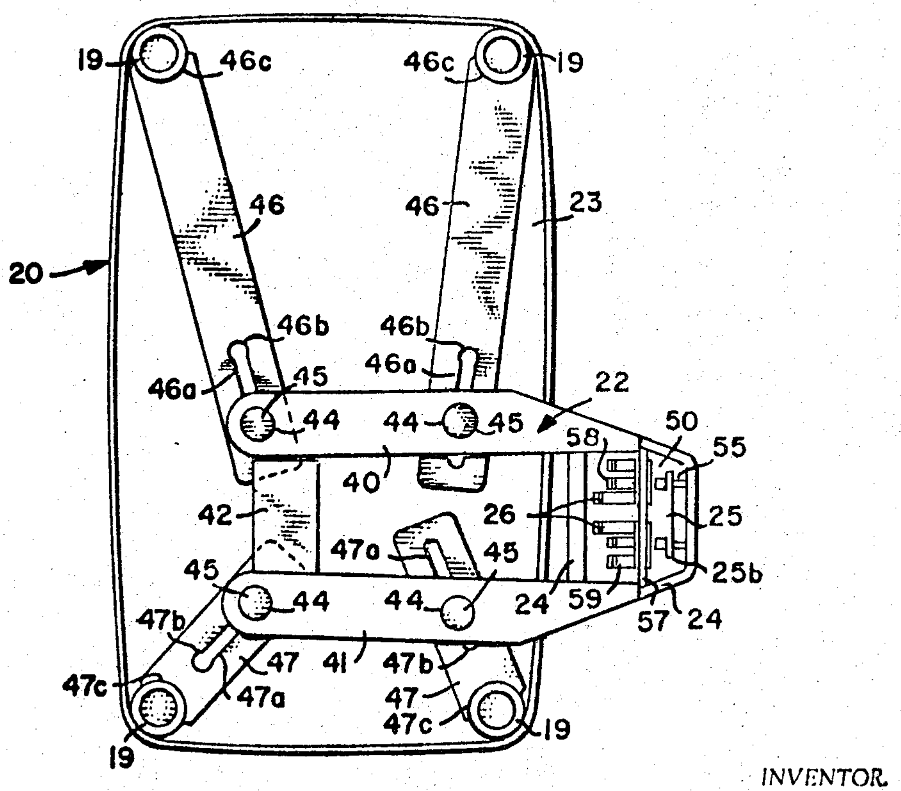
FIG. 2 is an enlarged plan view of the bottom of the telephone of FIG. 1 showing the attachment of the present invention.

Reference is made to FIG. 1 wherein a telephone 20 having a transmitter-receiver handset 21 is shown with an attachment 22 engaging the telephone base 23 and abutting feet 19 (FIG. 2). Switch housing 24 is integral with attachment 22, and a switch actuating lever 25 is shown extending from within housing 24 with one end of handset 21 resting on the lever 25 to maintain the switch 26 (see FIG. 5) in a predetermined condition. Electrical leads 27 and 28 are connected to switch 26 and extend to the interior of radio receiver 30, in which the leads 27 and 28 are connected to the audio circuit as will be described in more detail hereinafter. The radio receiver 30 is connected to a source of electrical power (not shown) by electrical wiring 31.

It is seen in FIG. 1 that the handset 21 rests in a normal fashion in telephone cradle 32, and in such position, the telephone is in a disconnected condition, and the radio 30 is allowed to emit sounds into the room in a normal manner dependent upon the station selected and at the volume selected.

Figures 3, 4, 5, 6:
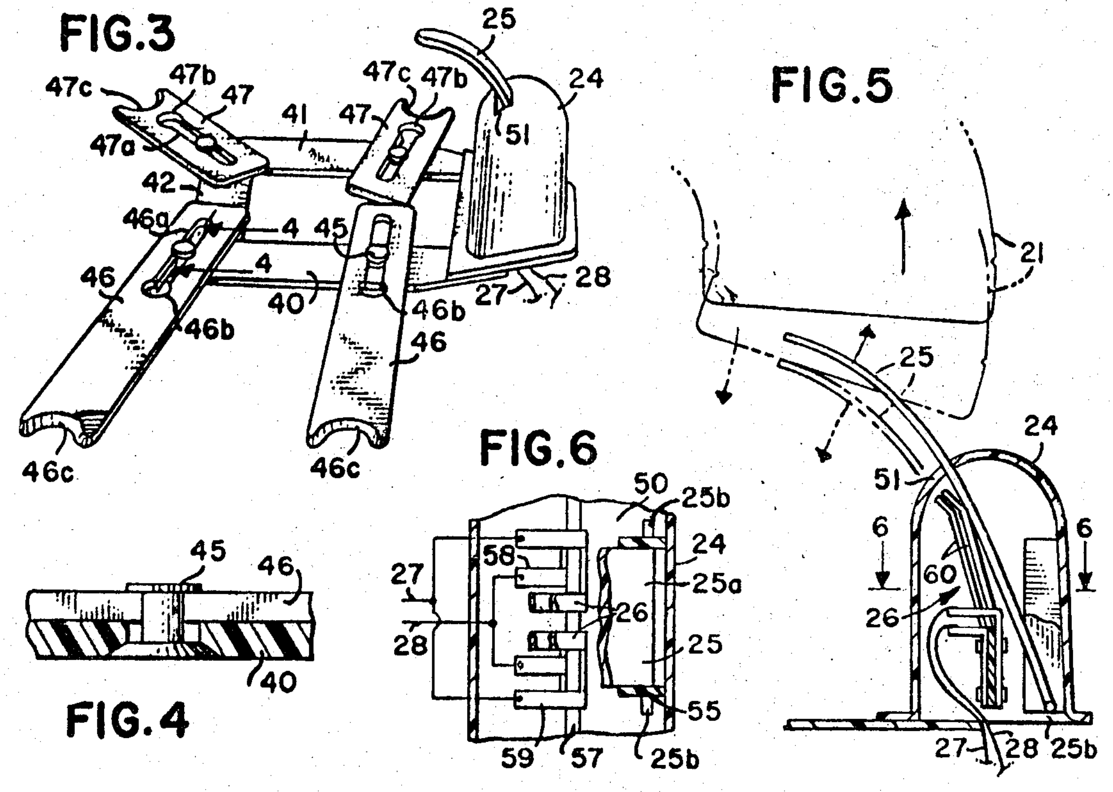
FIG. 3 is a perspective view of the attachment prior to installation on a telephone.
FIG. 4 is an enlarged cross-sectional view taken along line 4—4 of FIG. 3.
FIG. 5 is an enlarged elevational view in partial section showing the operation of the switch when the handset of the telephone is raised or lowered.
FIG. 6 is an enlarged plan view taken along 6—6 of FIG. 5.

If the phone rings while the radio is playing, it is only necessary to lift the handset 21 from the cradle 32, to disengage it from contact with switch lever 25. As can be seen in FIG. 5, the switch 26 is in a closed condition when the weight of handset 21 acts on the lever 25. With the handset lifted away from the lever 25, the switch 26 opens to allow the volume from the radio to be muted or completely eliminated, as will be described hereinafter in conjunction with the schematic diagrams of FIGS. 7–13.

Reference is now made to FIG. 2 wherein the attachment 22 and the integral switch housing 24 is shown as attached to the base of telephone 20. The attachment 22 comprises base members 40, 41 to which is secured across member 42, and switch housing 24 to form a somewhat rectangular entity of elements 40, 41, 42 and 24. In the preferred embodiment, the attachment 22 is formed of a plastic material with the separate members 40, 41, 42 and 24 secured as by adhesive material or the like. However, the attachment 22 could be made of lightweight metal or the like.

Base members 40 and 41 are provided with openings 44 into which collar fasteners 45 are inserted (see FIG. 4). The collar fasteners 45 slideably engage extendable arms 46, 47 at slotted portions **46*a* and 47*a* as best shown in FIGS. 3 and 4. At one end of slotted portions 46*a* and 47*a*, the slot is enlarged as at 46*b* and 47*b* to allow initial insertion of fasteners 45 when the enlarged portion of the slotted portions is aligned with opening 44 in base members 40 and 41**.

Further, the outward ends **47*c* and 46*c* of arms 46, 47 are of arcuate configuration to engage circular feet 19 in an abutting relation. Thus, with the arms 46, 47 slidably connected to base members 40, 41 by fasteners 45, the arms may be positioned until they engage feet 19 of the telephone 20. As the fasteners 45 hold in a press-fit fashion, the attachment is thus secured to the base of the telephone, and the telephone may be placed on a desk or the like without the attachment 22** scratching the surface as it is snugly held against the four feet of the telephone a spaced distance above the surface of the desk or the like.

With the arms 46, 47 properly adjusted, the switch housing 24 is aligned under the end of handset 21 so that the handset can engage switch lever 25 for the operation of switch 26.

The interior of switch housing 24 is best shown in FIGS. 2, 5 and 6, wherein the switch lever 25 is a curved strip of resilient plastic material that is insertable into the housing 24 through the opening 50 in the lower portion thereof. The lever 25 extends through the housing 24 at an opening 51, so that the upper end (as viewed in the drawings) of lever 25 can be engaged by handset 21 when the handset is located in cradle 32 of telephone 20.

At a lower portion **25*a* of lever 25 a pivot member 25*b* is provided for insertion into slot 55 of member 56 secured interiorly of housing 24. A press-fit relation exists between pivot member 25*b* and slot 55 so that the lever 25 is maintained within the housing 24**.

Also interior of the housing 24 is an insulating bar 57 to which terminals 58, 59 and switch contacts 60 are mounted. Switch contacts 60 are constructed of resilient conducting metal and are adapted to be moved in and out of electrical contact by the action of switch lever 25 thereagainst as is best shown in FIG. 5. When the handset 21 rests against switch lever 25, the lever 25 is urged downwardly against switch contacts 60 to close an electrical circuit, and when the handset 21 is lifted away from lever 25, the lever 25 springs away from switch contacts 60, to allow contacts 60 to separate to open the electrical circuits. Electrical leads 27, 28 are connected to the terminals 58, 59 and to a circuit within radio receiver 30, to be described hereinafter.

FIGS. 7–13 show schematic diagrams of various circuits illustrating the manner in which the switch 26, operated by switch lever 25, can be connected into a circuit of an audio device to control the volume thereof or to eliminate the sound from an audio device, such as radio receiver 30.

Figure 7:
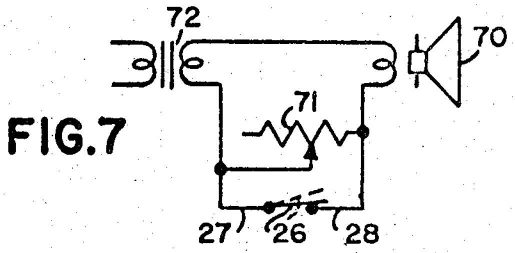
FIG. 7 is a schematic diagram of an audio circuit controlled by the switch to mute the sound from the speaker at a predetermined level.

In FIG. 7, the switch 26 is normally closed when the handset 21 is on the telephone cradle 32. When the handset is lifted, as in answering a telephone, the switch 26 opens and the sound through speaker 70 is reduced by reason of the setting of the variable resistor 71 in series with the speaker 70. The output transformer is designated as 72.

Figure 8:
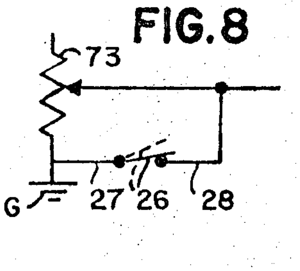
FIG. 8 is a schematic diagram of a variation in the audio circuit controlled by the switch.

In FIG. 8, the switch 26 is normally closed when the handset 21 acts against switch lever 25. By lifting the handset, the switch 26 opens to mute the audio volume through a resistor 73 in series with the speaker 70.

Figure 9:
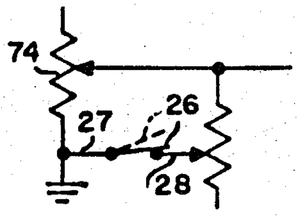
FIG. 9 is another schematic diagram of an audio circuit and switch.

In FIG. 9, the switch 26 is normally closed when the handset 21 is on the cradle 32. Lifting the handset opens the switch 26 to mute the volume of the audio device by grounding a variable resistance 74 in series with the speaker 70.

Figure 10:
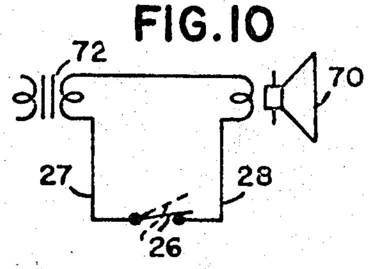
FIG. 10 is yet another schematic diagram of an audio circuit and switch.

In FIG. 10, the switch 26 is normally closed with the handset 21 on the cradle 32. When the handset is lifted away from the lever 25, the switch 26 is opened to break the circuit to the speaker 70, thus eliminating all sound from the speaker 70.

Figure 11:
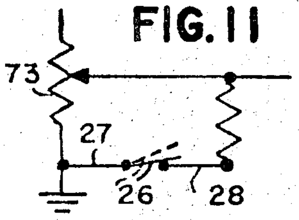
FIG. 11 is still another schematic diagram of an audio circuit and switch.

In FIG. 11, the switch 26 is normally closed, and is opened by lifting the handset 21 from the cradle 32 to mute the volume as established by a variable resistor 73 in series with the speaker 70.

Figure 12:
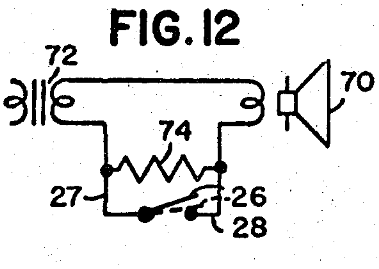
FIG. 12 is another schematic diagram of an audio circuit and switch.

In FIG. 12, the switch 26 is normally closed, and is opened by lifting the handset 21 to place shunt resistor 74 in the circuit to reduce or mute the volume emanating from the speaker 70 so that it is easier to carry on a telephone conversation, and wherein the volume at the speaker is restored to its original level when the handset 21 is again placed on the cradle 32.

Figure 13:
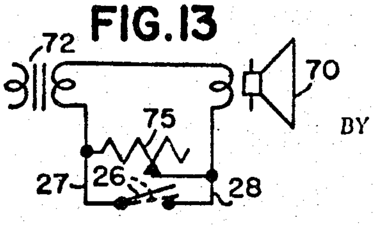
FIG. 13 is still another schematic diagram of an audio circuit and switch.

In FIG. 13, the switch 26 is normally closed, and is opened by lifting the handset 21. The opening of switch 26 places variable shunt resistor 75 in the circuit to reduce the volume from speaker 70. The variable resistance available in shunt resistor 75 allows a choice to be made in the amplitude that the volume level will be lowered when the handset 21 is lifted from cradle 32. If, for example, the speaker 70 is located somewhat far from the telephone, it is possible to reduce the volume a small amount so that the telephone conversation may be carried on without sound interference, while, at the same time, persons seated near the speaker 70 can still hear the sound emanating from the speaker and thus their enjoyment of the program is not interrupted by the answering of the telephone.

Thus, an attachment for a telephone has been described wherein the handset of the telephone engages a switch lever to actuate a switch mounted within switch housing that is integral with said attachment. The attachment is easily attached to the base of a telephone by extendable arms that frictionally and abuttingly engage the feet of the telephone. Further, the switch lever is easily fabricated from resilient plastic material, and is acted upon by the handset of the telephone to easily or close the switch as the case may be to control an audio device connected through the switch in the switch housing. Thus, it is with ease that the audio control switching attachment can be placed on a telephone to control an audio device remote from the telephone.

While a preferred embodiment of the invention has been illustrated and described, it is to be understood that the invention is not limited to the precise construction herein disclosed and that various changes and modifications may be made within the scope of the invention as defined in the appended claims.

What is claimed is:

1. An attachment for a telephone with a handset removable from a cradle of the telephone for controlling an electrical device at a remote location from said telephone, comprising attachment base members for placement under said telephone, extendable arms slidably attached to said attachment base members for securing said attachment to said telephone, and switch means supported by said attachment base members and engageable with said handset wherein said switch means is actuated to differing conditions by removing and replacing said handset relative to said telephone cradle for controlling the operation of said electrical device in response to removing and replacing said handset.

2. An attachment as claimed in claim 1 wherein said telephone is provided with a plurality of feet, and wherein said extendable arms are provided with arcuate end portions for engaging said feet to secure said attachment to said telephone.

3. An attachment as claimed in claim 1 wherein said switch means includes a resilient member engageable with said handset, and wherein said resilient member is positioned in accordance with removal or replacement of said handset relative to said telephone cradle.

4. An attachment as claimed in claim 3 wherein said switch means includes a pair of switch contacts engageable with said resilient member, said switch contacts being connected to said electrical device wherein movement of said resilient member by said handset moves said switch contacts into or out of engagement to control the electrical device in accordance with the relative position of said switch contacts.

5. An attachment as claimed in claim 1 wherein said extendable arms are slidably attached to said attachment base members by collar fasteners.

6. An attachment as claimed in claim 5 wherein said extendable arms are pivotal about said collar fasteners relative to said attachment base members to facilitate installation of said attachment to said telephone.

7. An attachment as claimed in claim 3 wherein said resilient member is press-fitted to said switching means and wherein said resilient member is urged in one direction by engagement of the handset therewith, and wherein said resilient member assumes another position when said handset is removed from engagement with said resilient member.

8. An attachment as claimed in claim 4 wherein said switch contacts are connected to said electrical device to deenergize the electrical device when the handset is removed from the telephone.

9. An attachment as claimed in claim 4 wherein said electrical device includes an audio circuit and wherein said switch contacts are connected to said audio circuit to open or close said audio circuit in accordance with said resilient member being positioned by the removal or replacement of said handset relative to said telephone cradle.

10. An attachment as claimed in claim 9 wherein said audio circuit includes means for muting volume from the electrical device when said handset is removed from said telephone.

11. An attachment as claimed in claim 9 wherein said audio circuit includes means for establishing volume at a predetermined level when said handset is removed from said telephone, and wherein the volume is restored to another predetermined level when said handset is replaced on the telephone.

12. An attachment for a telephone for electrically controlling an electrical device at a remote location from said telephone in response to removing a handset of said telephone relative to a handset cradle of said telephone, said attachment comprising switch means actuated by said handset, attachment base members integral with said switch means and attachment arms slidably and pivotably mounted on said attachment base members to engage said telephone for securement of said attachment base members thereto, said switch means being connected to said electrical device, whereby said switch means controls said electrical device in accordance with the position of said handset relative to said cradle of said telephone.

References Cited

UNITED STATES PATENTS

| | | | |
|---|---|---|---|
| 2,212,792 | 8/1940 | Reading | 179—2 |
| 2,616,972 | 11/1952 | McNutt | 179—2 |
| 2,792,450 | 5/1957 | Hof | 179—2 |

KATHLEEN H. CLAFFY, Primary Examiner

D. L. STEWART, Assistant Examiner